(12) United States Patent
Toh et al.

(10) Patent No.: US 7,171,000 B1
(45) Date of Patent: Jan. 30, 2007

(54) SIMPLIFIED ADDRESSING FOR PRIVATE COMMUNICATIONS

(75) Inventors: Eng-Whatt Toh, Singapore (SG); Peng-Toh Sim, Singapore (SG)

(73) Assignee: Message Secure Corp., Lowell, MA (US)

( * ) Notice: Subject to any disclaimer, the term of this patent is extended or adjusted under 35 U.S.C. 154(b) by 0 days.

(21) Appl. No.: 09/332,358

(22) Filed: Jun. 10, 1999

(51) Int. Cl.
*H04K 1/00* (2006.01)
*H04L 9/30* (2006.01)
*H04L 9/00* (2006.01)

(52) U.S. Cl. .................. 380/278; 380/30; 380/286; 713/168; 713/175; 713/189; 705/14; 705/64; 705/71

(58) Field of Classification Search ................ 713/201, 713/166, 170, 171, 180
See application file for complete search history.

(56) References Cited

U.S. PATENT DOCUMENTS

| | | |
|---|---|---|
| 4,625,076 A | 11/1986 | Okamoto et al. |
| 4,713,780 A | 12/1987 | Schultz et al. |
| 4,754,428 A | 6/1988 | Schultz et al. |
| 4,816,655 A | 3/1989 | Musyck et al. |
| 4,868,877 A | 9/1989 | Fischer |
| 5,005,200 A | 4/1991 | Fischer |
| 5,018,196 A | 5/1991 | Takaragi et al. |
| 5,138,653 A | 8/1992 | Le Clercq |
| 5,157,726 A | 10/1992 | Merkle et al. |
| 5,210,869 A | 5/1993 | Williams |
| 5,241,599 A | 8/1993 | Bellovin et al. |
| 5,261,002 A | 11/1993 | Perlman et al. |

(Continued)

FOREIGN PATENT DOCUMENTS

EP  0 869 652 A2  10/1998

(Continued)

OTHER PUBLICATIONS

"What's a VPN Anyway? A Virtual Private Networking Primer", VPNet Technologies, pp. 1-17.

(Continued)

*Primary Examiner*—Gilberto Barrón, Jr.
*Assistant Examiner*—Abdulhakim Nobahar
(74) *Attorney, Agent, or Firm*—Merek, Blackmon & Voorhees, LLC

(57) ABSTRACT

A system for securely transmitting an information package (10) to an addressee via a network (108) includes a directory interface (110) adapted to check a directory (112) to determine whether the addressee has a public key; an escrow key manager (116), coupled to the directory interface (110), adapted to provide an escrow encryption key for encrypting the package (10); a encryption module (114), coupled to the escrow key manager (116), adapted to encrypt the package (10) with the escrow encryption key; a computer-readable medium (118), coupled to the encryption module (114), adapted to store the package (10) in escrow for the addressee; a notification module (120), coupled to the computer-readable medium (118), adapted to send a notification to the addressee via the network (108); a key registration module (124), coupled to the notification module (120), adapted to issue, in response to the addressee acknowledging the notification, new public and private keys to the addressee; and a transmission module (122), coupled to the key registration module (124) and to the computer-readable medium (118), adapted to transmit the package (10) to the addressee via the network (108).

25 Claims, 4 Drawing Sheets

U.S. PATENT DOCUMENTS

| | | |
|---|---|---|
| 5,283,887 A | 2/1994 | Zachery |
| 5,293,250 A | 3/1994 | Okumura et al. |
| 5,303,361 A | 4/1994 | Colwell et al. |
| 5,315,635 A | 5/1994 | Kane et al. |
| 5,388,158 A | 2/1995 | Berson |
| 5,396,537 A | 3/1995 | Schwendeman |
| 5,398,285 A | 3/1995 | Borgelt et al. |
| 5,424,724 A | 6/1995 | Williams et al. |
| 5,432,785 A | 7/1995 | Ahmed et al. |
| 5,432,852 A | 7/1995 | Leighton et al. |
| 5,436,972 A | 7/1995 | Fischer |
| 5,544,152 A | 8/1996 | Obermanns et al. |
| 5,557,346 A | 9/1996 | Lipner et al. |
| 5,557,765 A | 9/1996 | Lipner et al. |
| 5,581,615 A | 12/1996 | Stern |
| 5,606,609 A | 2/1997 | Houser et al. |
| 5,623,653 A | 4/1997 | Matsuno et al. |
| 5,633,929 A | 5/1997 | Kaliski, Jr. |
| 5,638,446 A | 6/1997 | Rubin |
| 5,642,420 A | 6/1997 | Kuroda et al. |
| 5,671,285 A | 9/1997 | Newman |
| 5,689,565 A | 11/1997 | Spies et al. |
| 5,689,567 A | 11/1997 | Miyauchi |
| 5,706,452 A | 1/1998 | Ivanov |
| 5,721,777 A | 2/1998 | Blaze |
| 5,734,651 A | 3/1998 | Blakeley et al. |
| 5,745,573 A | 4/1998 | Lipner et al. |
| 5,751,813 A | 5/1998 | Dorenbos |
| 5,764,918 A | 6/1998 | Poulter |
| 5,767,847 A | 6/1998 | Mori et al. |
| 5,768,271 A | 6/1998 | Seid et al. |
| 5,751,814 A | 8/1998 | Smith et al. |
| 5,790,790 A | 8/1998 | Smith et al. |
| 5,799,086 A | 8/1998 | Sudia |
| 5,802,286 A | 9/1998 | Dere et al. |
| 5,812,671 A | 9/1998 | Ross, Jr. |
| 5,832,218 A | 11/1998 | Gibbs et al. |
| 5,841,865 A | 11/1998 | Sudia |
| 5,845,074 A | 12/1998 | Kobata |
| 5,850,451 A | 12/1998 | Sudia |
| 5,850,519 A | 12/1998 | Vazana |
| 5,864,683 A * | 1/1999 | Boebert et al. .............. 713/166 |
| 5,864,870 A | 1/1999 | Guck |
| 5,883,956 A | 3/1999 | Le et al. |
| 5,903,882 A | 5/1999 | Asay et al. |
| 5,920,630 A | 7/1999 | Wertheimer et al. |
| 5,982,506 A | 11/1999 | Kara |
| 5,987,140 A | 11/1999 | Rowney et al. |
| 5,995,756 A | 11/1999 | Herrmann |
| 6,026,416 A | 2/2000 | Kanerva et al. |
| 6,035,104 A | 3/2000 | Zahariev |
| 6,044,462 A | 3/2000 | Zubeldia et al. |
| 6,061,448 A * | 5/2000 | Smith et al. ................. 380/282 |
| 6,064,848 A | 5/2000 | Haneda |
| 6,064,878 A | 5/2000 | Denker et al. |
| 6,073,142 A | 6/2000 | Geiger et al. |
| 6,112,305 A | 8/2000 | Dancs et al. |
| 6,161,181 A * | 12/2000 | Haynes, III et al. ........ 713/170 |
| 6,192,130 B1 | 2/2001 | Otway |
| 6,282,535 B1 | 8/2001 | Pham et al. |
| 6,327,611 B1 | 12/2001 | Everingham |
| 6,338,140 B1 | 1/2002 | Owens et al. |
| 6,397,261 B1 * | 5/2002 | Eldridge et al. ............. 713/171 |
| 6,446,207 B1 * | 9/2002 | Vanstone et al. ........... 713/180 |
| 6,493,825 B1 | 12/2002 | Blumenau et al. |
| 6,549,935 B1 | 4/2003 | Lapstun et al. |
| 6,564,320 B1 | 5/2003 | de Silva et al. |
| 6,615,347 B1 | 9/2003 | de Silva et al. |
| 6,636,838 B1 | 10/2003 | Perlman et al. |
| 6,651,166 B1 * | 11/2003 | Smith et al. ................. 713/150 |
| 6,671,805 B1 | 12/2003 | Brown et al. |
| 6,836,792 B1 | 12/2004 | Chen |
| 2002/0023213 A1 | 2/2002 | Walker et al. |
| 2002/0091928 A1 | 7/2002 | Bouchard et al. |

FOREIGN PATENT DOCUMENTS

| | | |
|---|---|---|
| WO | WO 97 41661 A2 | 11/1997 |
| WO | WO 97 41661 A3 | 11/1997 |
| WO | WO 98 58332 A1 | 12/1998 |
| WO | WO 99/00958 | 1/1999 |

OTHER PUBLICATIONS

Herfert, M., "Security-Enhanced Mailing Lists" *IEEE Network*, IEEE Inc., New York, US, vol. 11, No. 3, May 1, 1997, pp. 30-33.

* cited by examiner

SIMPLIFIED ADDRESSING FOR PRIVATE COMMUNICATIONS

BACKGROUND OF THE INVENTION

1. Technical Field

The present invention relates generally to cryptographic communications, and more particularly, to a system and method for simplifying the addressing of public key-encrypted communications.

2. Description of Background Art

In symmetric key cryptography, both the sender and receiver of a message use the same secret key. The sender uses the secret key to encrypt the message and the receiver uses the same secret key to decrypt the message. However, a difficulty arises when the sender and receiver attempt to agree on the secret key without anyone else finding out. For example, if the sender and receiver are in separate physical locations, they must trust a courier, a telephone system, or some other transmission medium to prevent the disclosure of the secret key. Anyone who overhears or intercepts the key in transit can later read, modify, and forge all messages encrypted or authenticated with that key. Thus, symmetric key encryption systems present a difficult problem of key management.

Public key cryptography was developed as a solution to the key management problem. In public key cryptography, two keys are used—a public key and a private key. The public key is published, while the private key is kept secret. Although the public and private keys are mathematically related, neither can be feasibly derived from the other.

To send a private message using public key cryptography, a message is encrypted using the recipient's public key, which is freely available, and decrypted using recipient's private key, which only the recipient knows. Thus, the need for the sender and recipient to share secret information is eliminated. A sender only needs to know the recipient's public key, and no private keys are ever transmitted or shared.

Public key cryptography has another advantage over symmetric key cryptography in the ability to create digital signatures. One of the significant problems in cryptography is determining whether an encrypted message was forged or modified during transmission. As noted above, if a symmetric key is lost or stolen, any person in possession of the key can create forged messages or modify legitimate messages.

Using public key cryptography, however, a sender can digitally "sign" a message using the sender's private key. Thereafter, the recipient uses the sender's public key to verify that the message was actually sent by the sender and was not modified during transmission. Thus, a recipient can be confident that a message was actually sent by a particular sender and was not modified during transmission.

Despite its many advantages, public key cryptography presents three basic difficulties. First, in order to send private messages, the sender must know beforehand the public key of the recipient. Conventional public key systems typically rely on a sender's locally-maintained address book of public keys. Thus, if the recipient's public key is not in the sender's address book, the sender must somehow contact the recipient by telephone or e-mail, for example, to request the recipient's public key. Such systems are cumbersome and inconvenient, and prevent widespread adoption and use of public key cryptography.

More fundamentally, another problem with public key cryptography is that a recipient must first have a public key in order to receive an encrypted message. Because the technology is relatively new, only a few users have currently obtained public keys. This fact, alone, represents a significant barrier to adoption because a sender cannot encrypt a message to the recipient until the recipient has completed the process of obtaining a public key.

Yet another problem with public key cryptography is the relatively ease for "spoofing" a public key. In other words, a first user may publish his public key in the name of a second user and thereby receive private communications intended for the second user. Various solutions, such as digital certificates and certificate authorities (CA's), have been proposed to address this problem, but are not relevant to present application.

Accordingly, what is needed is a system and method for securely transmitting an information package using public key cryptography in which the sender is not required to know the recipient's public key before the package is sent. Indeed, what is needed is a system and method for securely transmitting an information package using public key cryptography in which the recipient is not required to have a public key before the package is sent.

DISCLOSURE OF INVENTION

The present invention solves the foregoing problems by providing a system and method for securely transmitting an information package (10) to an addressee via a network (108). In accordance with the present invention, a directory (112) of public keys is checked to determine whether the addressee of the package (10) has a public key. If the addressee does not have a public key in the directory (112), the package (10) is encrypted with an escrow encryption key. Thereafter, the package (10) is stored in escrow for the addressee pending notification of, and acknowledgment by, the addressee. A notification, such as an e-mail message, is sent to the addressee of the package (10) in escrow. When the addressee acknowledges the notification, the addressee is issued new public and private keys. Thereafter, the addressee's new public key is added to the directory (112) such that future packages (10) to the addressee may be encrypted using the addressee's public key. Finally, the package (10) is transmitted to the addressee.

Additionally, in accordance with the present invention, a system (100) for securely transmitting an information package (10) to an addressee via a network (108) includes a directory interface (110) adapted to check a directory (112) to determine whether the addressee has a public key; an escrow key manager (116), coupled to the directory interface (110), adapted to provide an escrow encryption key for encrypting the package (10); an encryption module (114), coupled to the escrow key manager (116), adapted to encrypt the package (10) with the escrow encryption key; a computer-readable medium (118), coupled to the encryption module (114), adapted to store the package (10) in escrow for the addressee; a notification module (120), coupled to the computer-readable medium (118), adapted to send a notification to the addressee via the network (108); a key registration module (124), coupled to the notification module (120), adapted to issue, in response to the addressee acknowledging the notification, new public and private keys to the addressee; and a transmission module (122), coupled to the key registration module (124) and the computer-readable medium (118), adapted to transmit the package (10) to the addressee via the network (108).

Using the present invention, a sender is not required to know the addressee's public key before a package (10) is sent. Indeed, the addressee is not required to have a public key before the package (10) is sent. If the addressee does not currently have a public key, the addressee will be issued new public and private keys, and the public key will be stored for future reference such that subsequent private communications may be encrypted using the addressee's public key. Thus, the present invention removes significant barriers to adoption of public key cryptography, while increasing the security of private communications.

BRIEF DESCRIPTION OF THE DRAWINGS

These and other more detailed and specific objects and features of the present invention are more fully disclosed in the following specification, reference being had to the accompanying drawings, in which.

DETAILED DESCRIPTION OF THE PREFERRED EMBODIMENTS

Figure 1:
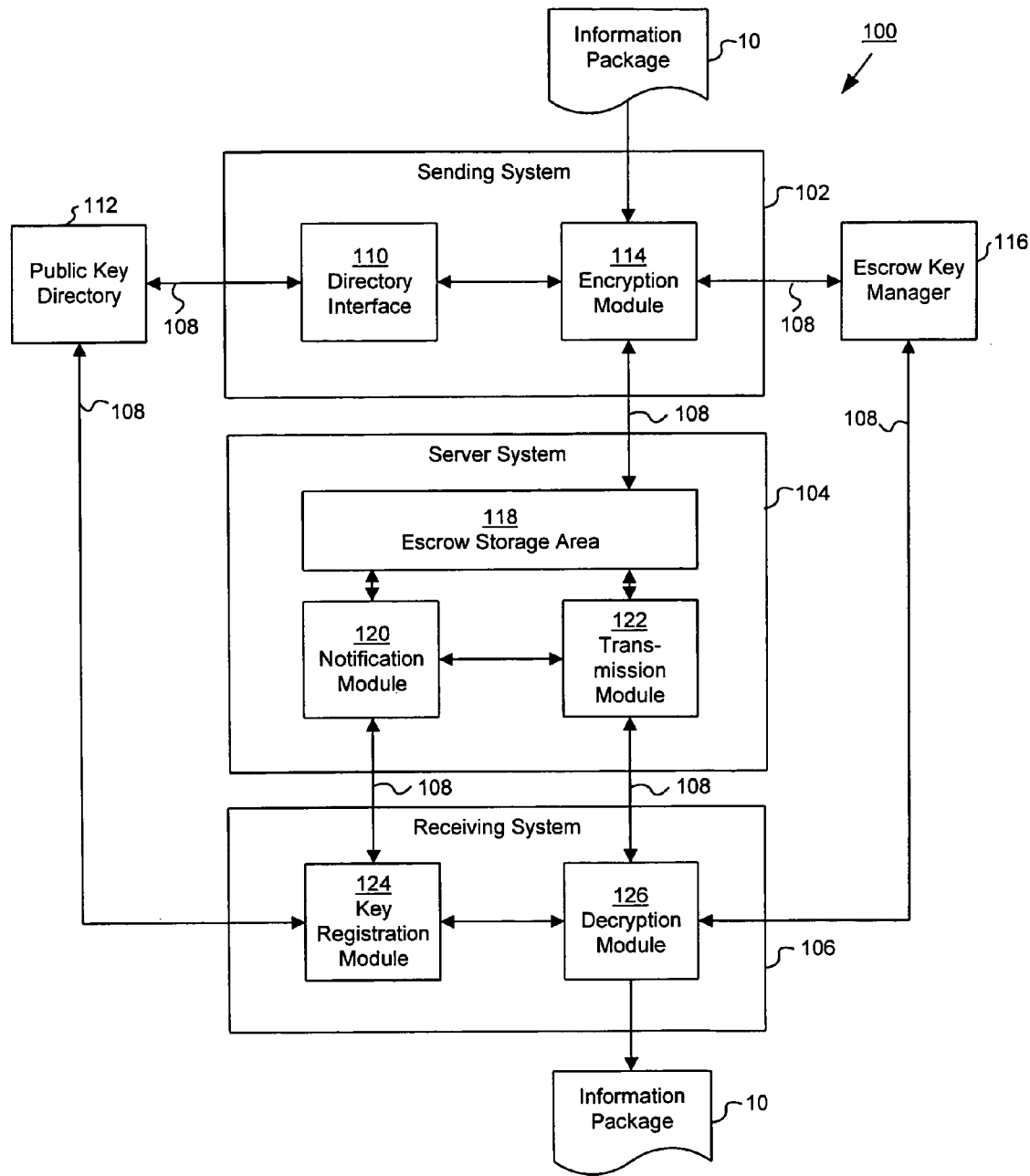
FIG. 1 is a functional block diagram of a secure communications system for transmitting information packages according to an embodiment of the present invention.

A preferred embodiment of the invention is now described with reference to the Figures, where like reference numbers indicate identical or functionally similar elements. Also in the Figures, the left most digit of each reference number corresponds to the Figure in which the reference number is first used. Referring now to FIG. 1, there is shown a functional block diagram of a secure communications system 100 for transmitting information packages 10 according to an embodiment of the present invention.

The principal components of the system 100 include a sending system 102, a server system 104, and a receiving system 106. The sending system 102 is coupled to the server system 104, and the server system 104 is coupled to the receiving system 106, via an "open" computer network 108, such as the Internet. Preferably, all transmissions over the network 108 are by a secure protocol, such as the Secure Multipurpose Internet Mail Extension (S/MIME) and/or the Secure Sockets Layer (SSL).

The sending system 102 is used by a sender to securely transmit an information package 10 to at least one intended "recipient", who is interchangeably referred to herein as an "addressee". In one embodiment, the sending system 102 includes a directory interface 110 for communicating via the network 108 with an external public key directory 112. The directory 112 is a database of the public keys of registered addressees and may be selectively queried to determine the public key of each addressee of the information package 10. Preferably, the directory 112 may be queried using the addressee's e-mail address.

In one embodiment, the public key directory 112 is implemented using an existing online directory infrastructure provided, for example, by VeriSign, Inc. of Mountain View, Calif. In alternative embodiments, however, the directory is implemented using a conventional database system, such as one available from SyBase, Inc., of Emeryville, Calif., although other databases could be used without departing from the spirit of the invention. Preferably, the directory 112 is accessed by the directory interface 110 using the Lightweight Directory Access Protocol (LDAP).

The sending system 102 also includes an encryption module 114 for encrypting information packages 10. The encryption module 114 is coupled to receive an escrow encryption key from an escrow key manager 116, as described in greater detail below. Preferably, the encryption module 114 uses a public key cryptosystem, available, for example, from RSA Data Security, Inc., of San Mateo, Calif. In alternative embodiments, however, a symmetric key algorithm, such as the Data Encryption Standard (DES), is used. Preferably, each encrypted package 10 conforms to the S/MIME standard, which is well known to those skilled in the art. In addition, key lengths of at least 128 bits (in the case of symmetric key cryptography) are preferably used to provide a high level of data security.

The escrow key manager 116 generates keys and/or provides stored keys for use in encrypting and decrypting information packages 10 to be stored in escrow. In one embodiment, the escrow key manager 116 is a process running on an separate escrow key management server (not shown), and the encryption module 114 communicates with the escrow key manager 116 via the network 108. Alternatively, the escrow key manager 112 is a functional unit contained within one or more of the sending system 102, the server system 104, or the receiving system 106.

The encryption module 114 is coupled via the network 108 to an escrow storage area 118 within the server system 104. In one embodiment, the escrow storage area 118 is a database for storing encrypted information packages and is managed, for example, by a SyBase database system. Once encrypted, an information package 10 is sent using a conventional protocol, such as the Hypertext Transfer Protocol (HTTP), to be stored within the escrow storage area 118 pending notification and authentication of the addressee. In alternative embodiments, however, the escrow storage area 118 is contained within the sending system 102, and packages 10 are stored locally until an addressee is notified and properly authenticated.

The server system 104 additionally includes a notification module 120 for sending a notification of the package 10 to an addressee at the receiving system 106. In one embodiment, the notification is an e-mail message, and the notification module 120 is an e-mail server, such as the Microsoft Exchange® Server 5.5, available from Microsoft Corporation of Redmond, Wash., although those skilled in the art will recognize that other notification systems and methods could be used within the scope of the present invention.

The server system 104 also includes a transmission module 122, the purpose of which is to transmit the package 10 from the escrow storage area 118 to a decryption module 126 in the receiving system 106. In one embodiment, the transmission module 122 is a standard Web server, such as the Windows NT® Server 4.0, available from Microsoft Corporation. Additionally, the decryption module 126 may be implemented using a standard Web browser, such as the Microsoft Internet Explorer®, with decryption logic being contained within a plug-in or Java applet. Those skilled in the art, however, will recognize that various other transmission systems and methods could be used without departing from the spirit of the invention. Preferably, communication between the transmission and decryption modules 122, 126 is by HTTP using SSL. Additionally, in one embodiment, the transmission module 122 is coupled to receive an addressee's public key from the directory 112 in order to authenticate the addressee, as described in greater detail below.

The notification module 120 is coupled via the network 108 to a key registration module 124 in the receiving system 106. The key registration module 124 is configured to issue new public and private keys to an addressee who does not currently have such keys, and is additionally configured to automatically add the addressee's new public key to the public key directory 112.

In one embodiment, the key registration module 124 is resident in the receiving system 106 before an information package 10 is sent by the sender. In an alternative embodiment, however, the notification module 120 is configured to send the key registration module 124 to the receiving system 106 as an attachment to an e-mail notification. In yet another embodiment, the e-mail notification includes a hyperlink, such as a Uniform Resource Locator (URL), which allows an addressee at a receiving system 106 to download the key registration module 124 using a conventional Web browser, such as the Netscape Communicator®, available from Netscape Communications Corporation of Mountain View, Calif.

As noted above, the receiving system 106 also includes a decryption module 126 for decrypting information packages 10. Like the encryption module 114, the decryption module 126 preferably uses a public key cryptosystem, available, for example, from RSA Data Security, Inc. However, in alternative embodiments, a symmetric key algorithm, such as the Data Encryption Standard (DES), may be used.

In one embodiment, the decryption module 126 is coupled to receive an escrow decryption key from the escrow key manager 116. Alternatively, the decryption module 126 is coupled to receive the addressee's private key from the key registration module 124. Using either the escrow decryption key or the private key, the decryption module 126 decrypts the information package 10 and provides the decrypted package 10 to the addressee.

Preferably, the systems 102, 104, and 106 described above, as well as the public key directory 112 and escrow key manager 116, are each implemented using conventional personal computers or workstations, such as IBM® PC-compatible personal computers or workstations available from Sun Microsystems of Mountain View, Calif. For example, FIG. 2 is a physical block diagram showing additional implementation details of the sending system 102, and is similar in all relevant respects to other systems described above.

Figure 2:
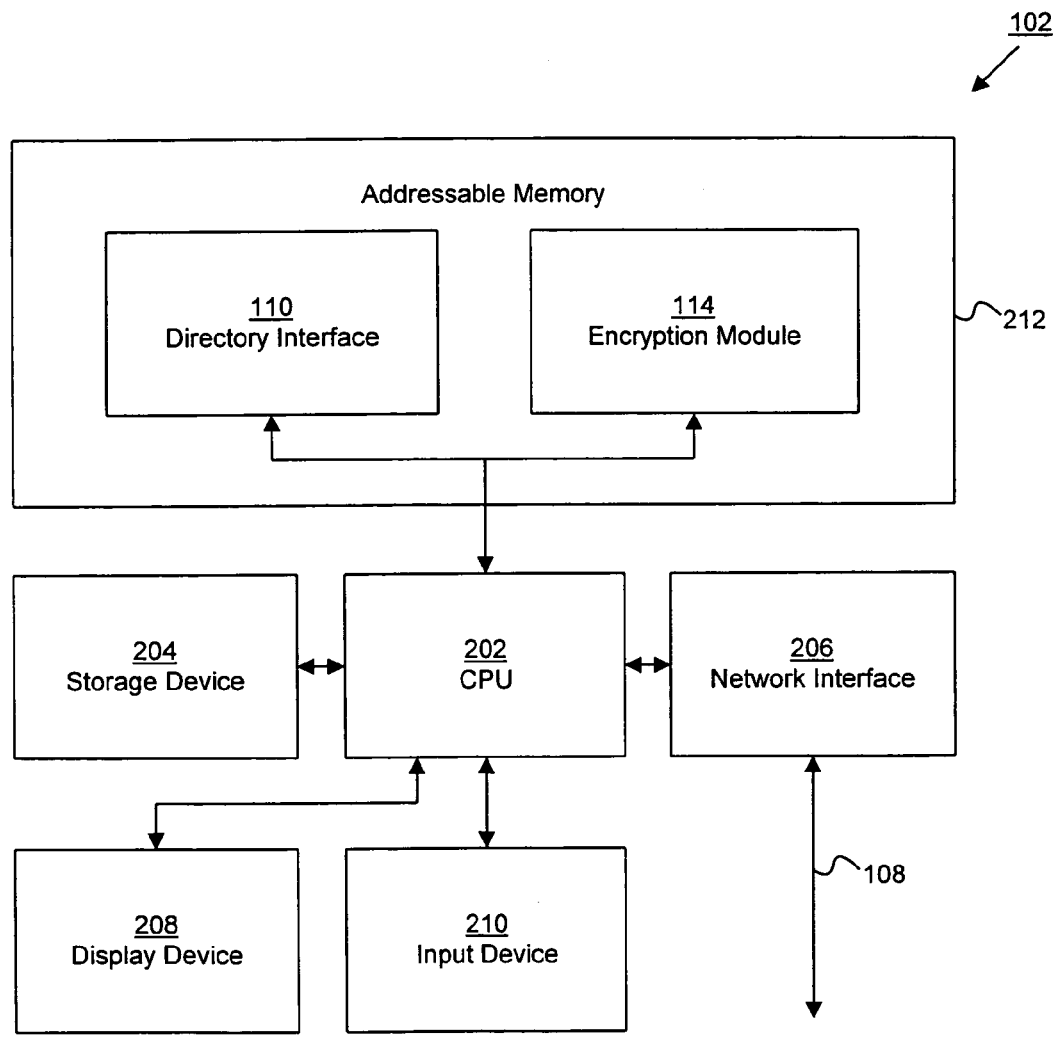
FIG. 2 is a physical block diagram showing additional implementation details of a sending system according to an embodiment of the present invention.

As illustrated in FIG. 2, a central processing unit (CPU) 202 executes software instructions and interacts with other system components to perform the methods of the present invention. A storage device 204, coupled to the CPU 202, provides long-term storage of data and software programs, and may be implemented as a hard disk drive or other suitable mass storage device. A network interface 206, coupled to the CPU 202, connects the sending system 102 to the network 108. A display device 208, coupled to the CPU 202, displays text and graphics under the control of the CPU 202. An input device 210, coupled to the CPU 202, such as a mouse or keyboard, facilitates user control of the sending system 102.

An addressable memory 212, coupled to the CPU 202, stores software instructions to be executed by the CPU 202, and is implemented using a combination of standard memory devices, such as random access memory (RAM) and read-only memory (ROM) devices. In one embodiment, the memory 212 stores a number of software objects or modules, including the directory interface 110 and encryption module 114 described above. Throughout this discussion, the foregoing modules are described as separate functional units, but those skilled in the art will recognize that the various modules may be combined and integrated into a single software application or device.

Figure 3:
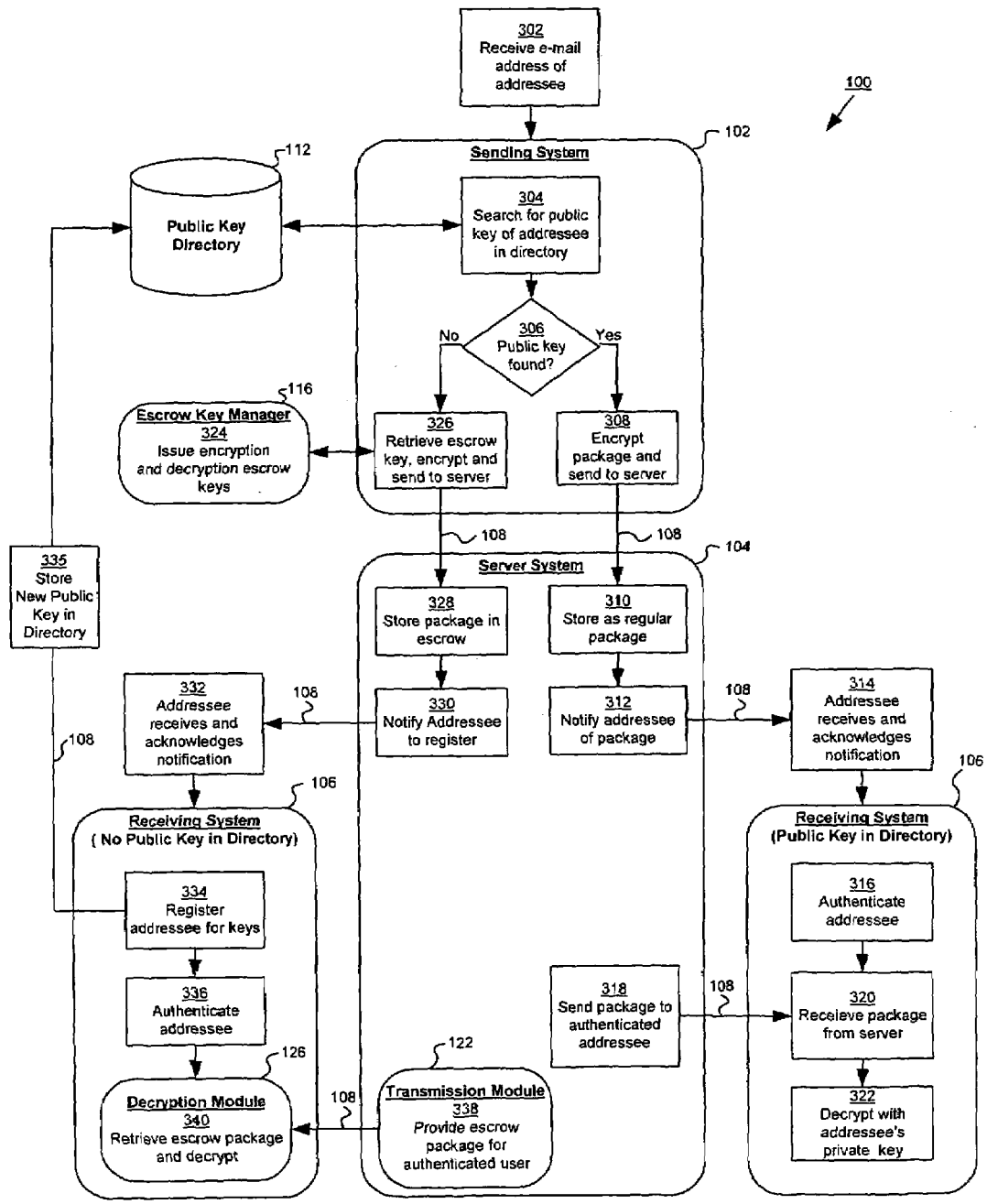
FIG. 3 is a flow diagram of a secure communication system according to an embodiment of the present invention.

Referring now to FIG. 3, there is shown a flow diagram of the system 100 according to an embodiment of the present invention. Referring also to FIG. 1, the sending system 102 initially receives 302 from the sender the addressee's e-mail address. Although the addressee's e-mail address is used in one embodiment, those skilled in the art will recognize that the sender may specify an addressee by name, which is associated, in the sending system 102, with an e-mail address or other unique identifier of the addressee. Although the addressee is referred to hereafter in the singular, those skilled in the art will recognize that a package 10 may have a plurality of addressees.

After the e-mail address is received, the sending system 102 searches 304 the public key directory 112 using the addressee's e-mail address to locate the public key of the addressee. As noted earlier, this is accomplished by means of a directory interface 110 in the sending system 102, which accesses the directory 112 using a standard protocol such as LDAP.

A determination 306 is then made whether the addressee's key was found in the directory 112. If the key was found, the package 10 is encrypted 308 by the encryption module 114 using the addressee's public key and is sent to the server system 104, where it is stored 310 as a "regular" package. The term "regular" is used to distinguish the package 10 from one being stored in "escrow" for an addressee who does not yet have a public key. In one embodiment, a separate storage area (not shown) in the server system 104 is provided for regular packages.

Next, the server system 104 notifies 312 the addressee about the package 10 being stored for the addressee. As noted earlier, this is done, in one embodiment, by the notification module 120, which uses an e-mail notification system. However, those skilled in the art will recognize that other notification systems and methods could be used without departing from the spirit of the invention. For example, the receiving system 106 may include a notification client (not shown) which receives user datagram protocol (UDP) notifications from the notification module 120. Upon receipt of a UDP notification, the notification client generates a visual or audible desktop notification to the addressee, such as a blinking icon, a chime, a pop-up dialog box, or the like. Other forms of notification could include a voice notification via a voice synthesis module, a pager notification via a conventional pager, or a facsimile notification via a standard facsimile.

After the addressee receives 314 and acknowledges the notification, such as by a return e-mail message, the person claiming to be the addressee is authenticated 316 to determine whether that person is, in fact, the addressee. Those skilled in the art will recognize that there are many ways to authenticate an addressee. For example, passwords or the like could be used.

Public key cryptography, however, provides a convenient and highly secure way for authenticating an addressee. In one embodiment, the addressee encrypts a standard message using the addressee's private key and sends the encrypted message to the transmission module 122 in the server system 104. The transmission module 122 obtains the addressee's public key from the public key directory 112, and attempts to decrypt the message using the addressee's public key. If the message is successfully decrypted, the addressee is known to hold the private key corresponding to the public key in the directory 112 and is therefore authentic. Those skilled in the art will recognize that the above authentication steps may be performed automatically by a Web server and Web browser (or by custom software programs), with little active intervention required by the addressee.

After the addressee is properly authenticated, the transmission module 122 sends 318 the package 10 via the network 108 to the receiving system 106, and the receiving system 106 receives 320 the package from the server 104. Those skilled in the art will recognize that either "push" or "pull" mechanisms could be used within the scope of the present invention. Preferably, HTTP and SSL are used, although other standard protocols could also be used without departing from the spirit of the invention. When the package 10 is received, the decryption module 126 decrypts 322 the package 10 using the addressee's private key, and provides the decrypted package 10 to the addressee.

The foregoing discussion was in the context of the addressee's public key being found in the directory 112. However, a more difficult situation arises when the addressee's public key is not in the directory 112. Indeed, when the addressee does not yet have a public key, conventional public key systems are wholly unable to send encrypted messages to the addressee. This represents a serious shortcoming of prior systems. The present invention solves this problem by holding the addressee's package 10 in escrow, as described in greater detail below.

Returning to step 306, if the addressee's public key was not found in the directory 112, the escrow key manager 116 issues 324, for the package 10, an escrow encryption key and an escrow decryption key. The escrow encryption key is used for encrypting the package 10 prior to being stored in escrow, and the escrow decryption key is used for decrypting the package 10.

The escrow encryption/decryption keys should not be confused with the new public and private keys issued to the addressee, as described in step 336. If the escrow encryption/decryption keys were to be issued to the addressee, they would need to be transmitted to the addressee via the network 108, resulting in the same drawbacks as symmetric key cryptography. In public key cryptosystems, the addressee's private key should never be sent to the addressee. Thus, in accordance with the present invention, the addressee's private key is generated locally at the receiving computer 106, and only the addressee's public key is sent via the network 108 to the directory 112.

In one embodiment, the escrow encryption/decryption keys are asymmetric keys generated according to the RSA algorithm for key generation. Alternatively, the keys are symmetric keys. In yet another embodiment, the keys are stored, not generated, by the escrow key manager 116, and are either hard-coded into the escrow key manager 116 or are added and periodically updated by an external agent or process. In still another embodiment, the public escrow key is published in the directory 112, and the server system 104 keeps the private escrow key in a hardware device that protects it from tampering, providing the highest level of security against tampering with the escrow keys.

After the keys are issued, the encryption module 114 within the sending system 102 retrieves 326 the escrow encryption key, encrypts the package 10 using the escrow encryption key, and sends the encrypted package 10 to the server system 104. The package 10 is then stored 328 in the escrow storage area 118. As described hereafter, the server system 104 holds the package in escrow for the addressee until the addressee has properly registered and received new public and private keys.

As in the case of a regular package, the addressee is then notified 330 of the package 10 being stored in escrow and the need to register for public and private keys. In one embodiment, the notification is an e-mail message. Preferably, the notification message includes a copy of the key registration module 124 as an e-mail attachment. Preferably, the notification message including the key registration module 124 is digitally signed in order to verify the source of the message. In alternative embodiments, however, the notification includes a hyperlink, such as a URL, to permit the addressee to download the key registration module 124 from the server system 104 or another location.

After the addressee has received 332 and acknowledged the notification and has either extracted or downloaded the key registration module 124, the addressee uses the key registration module 124 to register 334 for new public and private keys. As noted above, these keys are not the same as those issued by the escrow key manager 116. Preferably, the new public and private keys are generated according to the RSA algorithm for key generation, and are issued locally at the receiving system 106.

In one embodiment, the registration process is similar to the procedure used by VeriSign, Inc. and other certificate authorities to issue certificates, and involves prompting the addressee for various personal data, including, for example, the addressee's name, address, telephone number, e-mail address, and the like. Those skilled in the art will recognize that various procedural safeguards may be used to increase the reliability of the data obtained from the addressee.

After the addressee has registered, the addressee's new public key is automatically transmitted via the network 108 and stored 335 in the public key directory 112. This is advantageous because a subsequent package 10 being sent to the same addressee will be encrypted using the addressee's public key, providing a higher degree of security since no escrow keys are involved.

Next, the addressee is authenticated 336 to determine whether the person claiming to be the addressee is, in fact, the addressee. As described previously with respect to step 316, authentication may involve encrypting a standard message at the receiving computer 106 using the addressee's private key, and decrypting the message at the server computer 102 using the addressee's public key as obtained from the directory 112.

After the addressee is authenticated, the transmission module 122 in the server system 104 sends 338 the package 10 of the authenticated addressee to the decryption module 126 in the receiving system 106. The decryption module 126 then decrypts 340 the package 10 and provides the decrypted package 10 to the addressee. As described below, this process may be done in a number of ways.

Figure 4:
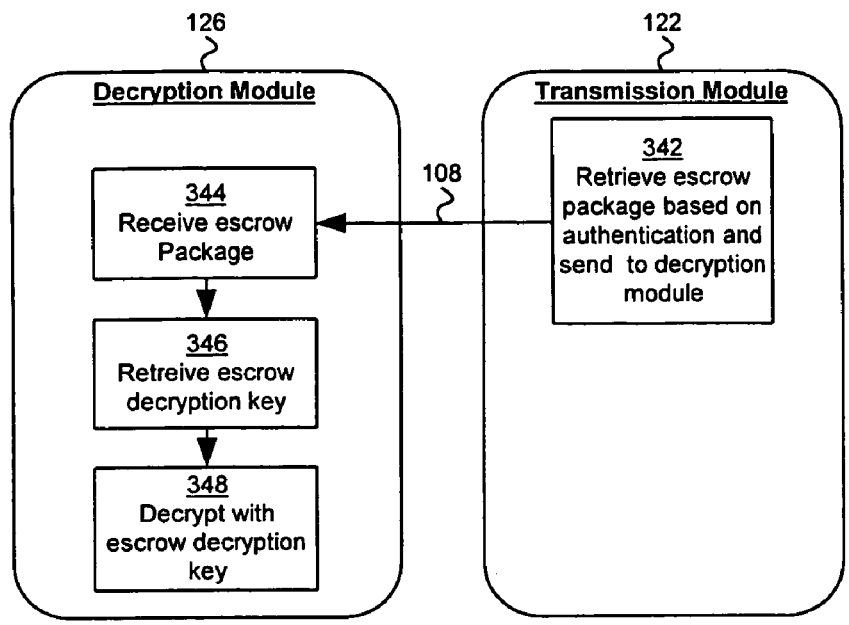
FIG. 4 is a flow diagram of a first embodiment of a transmission module and a decryption module according to an embodiment of the present invention.

Referring now to FIG. 4, there is shown a first embodiment of the interaction between the transmission and decryption modules 122, 126. Initially, the transmission module 122 retrieves 342 the package 10 being stored in escrow for the authenticated addressee and sends the package 10 via the network 108 to the decryption module 122, which receives 344 the package 10. Thereafter, the decryption module 126 retrieves 346 the escrow decryption key for the package 10 from the escrow key manager 116. Using the escrow decryption key, the decryption module 126 then decrypts 348 the package 10.

Figure 5:
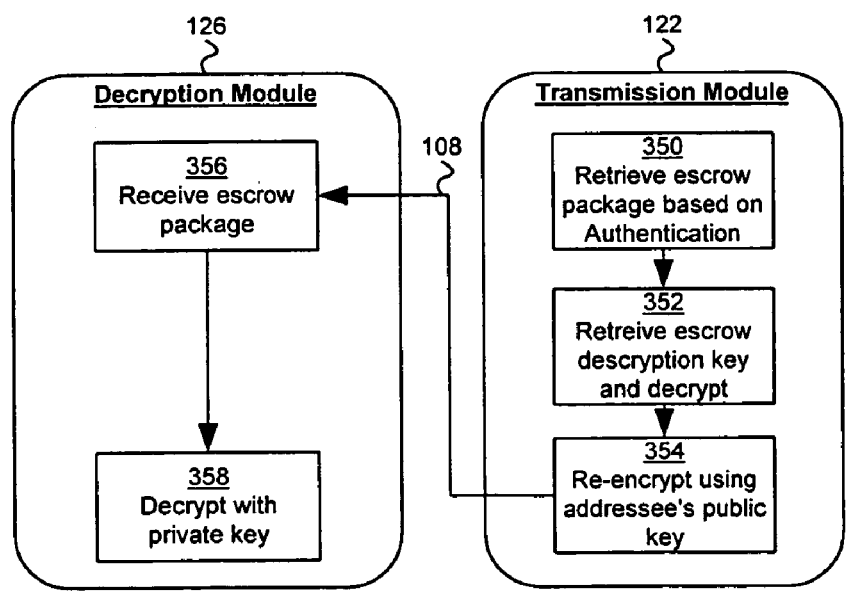
FIG. 5 is a flow diagram of a second embodiment of a transmission module and a decryption module according to an embodiment of the present invention.

Referring now to FIG. 5, there is shown a second and more secure embodiment of the interaction between the transmission and decryption modules 122, 126. Initially, the transmission module 122 retrieves 350 the package 10 being stored in escrow for the authenticated user. Thereafter, the transmission module 120 retrieves 352 the escrow decryption key from the escrow key manager 116, and decrypts the package 10 using the escrow decryption key. Next, the transmission module 120 re-encrypts 354 the package 10 using the addressee's new public key, which may be obtained from the directory 112 or the key registration module 124. After the package 10 is re-encrypted, it is sent via the network 108 to the decryption module 126, which receives 356 the package 10 and decrypts 358 the package 10 using the addressee's private key.

The above description is included to illustrate the operation of the preferred embodiments and is not meant to limit the scope of the invention. The scope of the invention is to be limited only by the following claims. From the above discussion, many variations will be apparent to one skilled in the art that would yet be encompassed by the spirit and scope of the present invention.

What is claimed is:

1. A computer-implemented method for securely transmitting an information package from a sender to an addressee via a network, the method comprising the steps of:
   searching at least one database to determine whether the addressee has a public key in order to determine the type of encryption to be performed on the package;
   upon a determination that the addressee does have a public key, encrypting the package with the addressee's public key and not encrypting the package with an escrow encryption key;
   only upon a determination that the addressee does not have a public key, selectively encrypting the package with the escrow encryption key;
   storing the escrow key encrypted package in escrow for the addressee prior to receiving a public key for the addressee;
   notifying the addressee of the package stored in escrow; and
   in response to receiving an acknowledgement from the addressee:
   issuing new public and private keys to the addressee, where said new public key is not equal to said escrow encryption key; and
   in response to subsequently verified authentication of the addressee:
   transmitting the package to the addressee via the network.

2. The method of claim 1, wherein the step of determining whether the addressee has a public key comprises the sub-step of:
   checking a public key directory for a public key of the addressee.

3. The method of claim 1, further comprising the step of:
   storing the addressee's new public key in a public key directory.

4. The method of claim 1, wherein the encrypting step comprises the sub-steps of:
   providing an escrow encryption key and an escrow decryption key,
   wherein the escrow encryption and decryption keys comprise one of symmetric keys and asymmetric keys; and
   encrypting the package with the escrow encryption key.

5. The method of claim 1, wherein the notifying step comprises the sub-step of:
   sending a notification to the addressee via the network, wherein said notification includes an attached module for generating private and public keys at the addressee location.

6. The method of claim 5, wherein the notification comprises one of an e-mail notification, a desktop notification, a voice notification, a pager notification, and a facsimile notification.

7. The method of claim 1, further comprising the step of:
   decrypting the package with an escrow decryption key corresponding to the escrow encryption key.

8. The method of claim 1, wherein the escrow encryption key is different from the new public and private keys issued to the addressee.

9. The method of claim 1, wherein the acknowledgement from the addressee includes an indication of the addressee's name and e-mail address.

10. The method of claim 1, further comprising the step of:
    in response to an address having a public key;
    encrypting the package with the addressee's public key;
    storing the package;
    notifying the addressee of the package;
    authenticating a user as the addressee by manipulating a message sent by the addressee encrypted using the addressee's private key; and
    transmitting the package to the authenticated addressee in response to authenticating the user as the addressee.

11. A computer implemented method for securely transmitting an information package to an addressee via a network, the method comprising the steps of:
    determining whether to apply escrow encryption to a file by checking at least one electronic directory to determine whether the addressee has a public key; and
    only in response to a determination that the addressee has a public key, encrypting the package using the addressee's new public key and transmitting the addressee's new public key encrypted package to the addressee via the network without storing said package in escrow; and
    only in response to a determination that the addressee does not have a public key:
    encrypting the package with an escrow encryption key,
    storing the escrow key encrypted package in escrow for the addressee;
    notifying the addressee of the package in escrow; and
    in response to receiving an acknowledgement from the addressee:
    issuing new public and private keys to the addressee;
    decrypting the package with an escrow decryption key;
    re-encrypting the package using the addressee's new public key; and
    transmitting the addressee's new public key encrypted package to the addressee via the network, wherein said addressee's new public key is not identical to said escrow encryption key.

12. The method of claim 11, wherein the step of determining whether the addressee has a public key comprises:
    checking a public key directory for a public key of the addressee.

13. The method of claim 11, further comprising the step of:
    storing the addressee's new public key in a public key directory.

14. The method of claim 11, wherein the step of transmitting the package comprises the sub-steps of:
  authenticating the user as the addressee using a digital signature of addressee; and
  transmitting the package to the authenticated user via the network.

15. The method of claim 11, further comprising the step of:
  decrypting the package using he addressee's new private key.

16. In a computer-readable medium, a computer program product for securely transmitting an information package to an addressee via a network, the computer-readable medium comprising program code adapted to perform the steps of:
  determining whether the addressee has a public key;
  only in response to a determination that the addressee does have a public key, encrypting the package with the addressee's public key and transmitting the addressee's public key encrypted package to the addressee;
  only in response to a determination that the addressee does not have a public key:
    encrypting the package with an escrow encryption key;
    transmitting the escrow key encrypted file to an escrow storage area and storing the encrypted package in escrow for the addressee;
    notifying the addressee of the package in escrow; and
    in response to receiving an acknowledgement from the addressee:
      transmitting a new public and private keys generation module to the addressee;
      issuing new public and private keys at addressee's location, where said new public key is not identical to the escrow encryption key;
      contingent upon authentication of the addressee based on a message sent by addressee subsequent in time to the acknowledgement received from the addressee, transmitting the package to the addressee via the network; and
  wherein the package is encrypted by at least the escrow key or the addressee's public key during each transmission of the information package across the network until the package is received by the addressee.

17. The method of claim 1, wherein said step of authentication of the addressee includes the sub-steps of:
  the addressee encrypting a message using addressee' private key;
  the addressee sending said private-key encrypted message to the sender;
  the sender decrypting said private-key encrypted message using addressee's public key;
  the sender authenticating the addressee based on the content of the decryption of said private-key encrypted message.

18. The method of claim 1, wherein said step of authentication of the addressee includes the sub-steps of:
  the addressee requesting registration with a certificate authority;
  the certificate authority registering the addressee subsequent to verifying at least one of the addressee's name, address, telephone number, e-mail address;
  the certificate authority generating at least a public key associated with the addressee;
  the certificate authority making the public key available for use by the sender; and
  the sender authenticating the addressee based on decryption of a message using the public key.

19. A computer-implemented method for securely transmitting an information package from a sender to an addressee via a network, the method comprising the steps of:
  a sender on a first computer addressing an information package to an addressee;
  checking at least one directory to determine whether the addressee has a public key;
  only in response to a determination that the addressee has a public key, encrypting the package with the addressee's public key and transmitting the addressee's public key encrypted package to said addressee without waiting for an acknowledgement from the addressee;
  only in response to a determination that the addressee does not have a public key:
    encrypting the package with an escrow encryption key;
    transmitting the escrow key encrypted package through the network to an escrow storage area remote from said first computer;
    storing the escrow encrypted package in escrow in said escrow storage area for the addressee prior to receiving a public key for the addressee;
    notifying the addressee of the package stored in escrow; and
    in response to receiving an acknowledgement from the addressee:
      issuing new public and private keys to the addressee; and
      in response to subsequently verified authentication of the addressee:
        transmitting the encrypted information package to the addressee via the network.

20. A computer-implemented method for securely transmitting an information package from a sender to an addressee via a network, the method comprising the steps of:
  a sender on a first computer addressing an information package to an addressee;
  checking at least one electronic directory to determine whether the addressee has a public key;
  in response to a determination that the addressee has a public key, encrypting the package with the addressee's public key and transmitting the addressee's public key encrypted package to said addressee;
  only in response to a determination that the addressee does not have a public key:
    encrypting the package with an escrow encryption key and subsequently transmitting the escrow key encrypted package through the network to an escrow storage area on a network computer remote from said first computer;
    storing the escrow encrypted package in escrow in said escrow storage area for the addressee prior to receiving a public key for the addressee;
    notifying the addressee of the package stored in escrow; and
    in response to receiving an acknowledgement from the addressee:
      issuing new public and private keys to the addressee; and
      in response to subsequently verified authentication of the addressee:
        transmitting the encrypted information package to the addressee via the network.

21. The computer-implemented method of claim 20, wherein said escrow encryption key is independent of the computer on which the escrow key encrypted document is stored.

22. The computer-implemented method of claim 20, wherein said escrow encryption key is document dependent.

23. The computer-implemented method of claim 20, wherein said escrow encryption key is addressee public key determination dependent.

24. The computer-implemented method of claim 20, wherein said escrow encryption key is not equal to said addressee's new public key.

25. The computer-implemented method of claim 20, further comprising the step of:

subsequent to the step of issuing the new public encryption key, decrypting the package with an escrow decryption key;

re-encrypting the package using the addressee's new public key prior to the step of transmitting the addressee's new public key encrypted package to the addressee via the network.

* * * * *